United States Patent [19]

Kaufmann

[11] 4,372,665

[45] Feb. 8, 1983

[54] AUTOMATIC VARIABLE-QUANTITY/FIXED-TIME ANTI-OXIDATION REPLENISHER CONTROL SYSTEM

[75] Inventor: Kenneth M. Kaufmann, Minneapolis, Minn.

[73] Assignee: Pako Corporation, Minneapolis, Minn.

[21] Appl. No.: 321,392

[22] Filed: Nov. 16, 1981

[51] Int. Cl.³ ........................ G03D 3/06; G05D 11/00

[52] U.S. Cl. .................................... 354/298; 364/502; 137/93; 137/624.13; 222/639

[58] Field of Search ........................ 354/297, 298, 324; 350/10, 27, 559; 356/443, 444; 222/638, 639, 642, 644, 646-648, 71; 137/93, 624.15, 624.13; 364/500, 502

[56] References Cited

U.S. PATENT DOCUMENTS

| | | | |
|---|---|---|---|
| 3,472,132 | 10/1969 | Hixon et al. | 95/89 |
| 3,529,529 | 9/1970 | Schumacher | 95/89 |
| 3,554,109 | 1/1971 | Street | 95/89 |
| 3,559,555 | 2/1971 | Street | 95/89 |
| 3,561,344 | 2/1971 | Frutiger | 95/89 |
| 3,696,728 | 10/1972 | Hope | 95/89 |
| 3,752,052 | 8/1973 | Hope et al. | 95/89 |
| 3,787,689 | 1/1973 | Fidelman | 250/219 |
| 3,822,723 | 7/1974 | Crowell et al. | 137/624.15 |
| 3,927,417 | 11/1975 | Kinoshita et al. | 354/298 |
| 3,990,088 | 11/1976 | Takita | 354/298 |
| 4,057,818 | 11/1977 | Gaskell et al. | 354/298 |
| 4,104,670 | 8/1978 | Charnley et al. | 354/324 |
| 4,119,952 | 10/1978 | Takahashi et al. | 340/309 |
| 4,128,325 | 12/1978 | Melander et al. | 354/298 |
| 4,134,663 | 1/1979 | Laar et al. | 354/298 |
| 4,174,169 | 11/1979 | Melander et al. | 354/324 |

OTHER PUBLICATIONS

Luth, *Elektronic-Film-Processor 120/48″E.*
Luth, *Elektronic-Film-Processor LT600/24″E.*

*Primary Examiner*—William B. Perkey
*Attorney, Agent, or Firm*—Kinney, Lange, Braddock, Westman and Fairbairn

[57] ABSTRACT

A processor of photosensitive material includes an automatic control system for providing anti-oxidation replenishment and preventing anti-oxidation overreplenishment, as a function of a stored anti-oxidation replenishment rate and anti-oxidation replenishment provided by exhaustion replenishment. A fixed time interval is initiated after which the anti-oxidation replenishment required due to expired time is compared to the amount of anti-oxidation replenishment provided by the exhaustion replenishment in that time interval. An amount of needed anti-oxidation replenishment is added to the developer tank, as a function of the difference by which the required anti-oxidation replenishment exceeds the anti-oxidation provided by exhaustion replenishment. If the accumulated amount of replenishment exceeds the anti-oxidation replenishment needed, no replenishment is provided and the excess value is carried over to a subsequent time interval so that the accumulated overreplenishment errors which occurred in prior art fixed time/variable quantity replenishment systems are eliminated.

7 Claims, 2 Drawing Figures

AUTOMATIC VARIABLE-QUANTITY/FIXED-TIME ANTI-OXIDATION REPLENISHER CONTROL SYSTEM

CROSS REFERENCE TO PATENTS AND COPENDING APPLICATIONS

Reference is hereby made to my patents entitled AUTOMATIC REPLENISHER CONTROL SYSTEM, U.S. Pat. No. 4,293,211, issued Oct. 6, 1981; AUTOMATIC ANTI-OXIDATION REPLENISHER CONTROL, U.S. Pat. No. 4,295,792, issued Oct. 20, 1981; and the following copending applications: AUTOMATIC FIXED-QUANTITY/FIXED-TIME ANTI-OXIDATION RELPLENISHER CONTROL SYSTEM Ser. No. 321,619 filed Nov. 16, 1981; AUTOMATIC FIXED-QUANTITY/VARIABLE-TIME ANTI-OXIDATION REPLENISHER CONTROL SYSTEM Ser. No. 323,073 filed Nov. 19, 1981; and AUTOMATIC VARIABLE-QUANTITY/VARIABLE-TIME ANTI-OXIDATION REPLENISHER CONTROL SYSTEM Ser. No. 321,394 filed Nov. 16, 1981. All of these applications are assigned to the assignee of the present application.

BACKGROUND OF THE INVENTION

1. Field of the Invention

The present invention relates to an automatic anti-oxidation replenisher control system for use in processors of photosensitive material.

2. Description of the Prior Art

Automatic photographic film and paper processors transport sheets or webs of photographic film or paper through a sequence of processor tanks in which the photosensitive material is developed, fixed, and washed, and then transport the material through a dryer. It is well known that photographic processors require replenishment of the processing fluids to compensate for changes in the chemical activity of the fluids.

First, it has been recognized that replenishment is necessary to replace constituents used as photosensitive film or paper is developed in the processor. This replenishment is "use related" or "exhaustion" chemical replenishment. Both developer and fix solutions require exhaustion replenishment.

Second, chemical activity of the developer solution due to aerial oxidation occurs with the passage of time regardless of whether film or paper is being processed. Replenishment systems provide additional replenishment of an "anti-oxidation" (A-O) replenishment solution which counteracts this deterioration.

Replenishment systems were originally manually operated. The operator would visually inspect the processed film or paper and manually operate a replenishment system as he deemed necessary. The accuracy of the manual replenishment systems was obviously dependent upon the skill and experience of the operator.

Various automatic replenishment systems have been developed for providing use-related replenishment. Examples of these automatic replenishment systems include U.S. Pat. Nos. 3,472,143 by Hixon et al; 3,529,529 by Schumacher; 3,554,109 by Street et al; 3,559,555 by Street; 3,561,344 by Frutiger et al; 3,696,728 by Hope; 3,752,052 by Hope et al; 3,787,686 by Fidelman; 3,927,417 by Kinoshita et al; 3,990,088 by Takita; 4,057,818 by Gaskell et al; 4,104,670 by Charnley et al; 4,119,952 by Takahashi et al; 4,128,325 by Melander et al; and 4,134,663 by Laar et al.

Examples of prior art replenisher controls for providing both exhaustion and anti-oxidation replenishment are shown in U.S. Pat. Nos. Re. 30,123 by Crowell et al and 4,174,169 by Melander et al. In particular, these patents show systems which are usable to control anti-oxidation replenishment when a type of anti-oxidation replenishment known as "blender chemistry" is used. Blender chemistry is based upon a "minimum daily requirement" of anti-oxidation replenishment. This minimum daily requirement is dependent upon the amount of aerial oxidation which occurs in the developer tank, which in turn is dependent upon the open surface area of the tank, the operating temperature of the developer solution, and a number of other factors. With blender chemistry, some anti-oxidation replenishment is provided each time that exhaustion replenishment occurs. The more exhaustion replenishment provided, the less separate anti-oxidation replenishment is required.

Crowell discloses a variable quantity, fixed time anti-oxidation replenishment control in which a variable amount of anti-oxidation replenishment needed due to aging is determined at fixed time intervals based upon the replenishment provided by use or exhaustion replenishment during the time interval. At fixed time intervals, a needed amount of anti-oxidation replenishment is added, which varies from zero up to a predetermined maximum amount. The more exhaustion replenishment provided during the time interval, the less anti-oxidation replenishment is required. The apparatus in Crowell does not consider, however, the situation where more anti-oxidation replenishment than is needed is provided by the exhaustion replenishment. Thus overage can lead to an accumulated error in the Crowell system. Overreplenishment of anti-oxidation fluid will produce incorrect processing results, just as will underreplenishment. There is no recognition in Crowell that this error accumulation can occur, or of any way to resolve it. In addition, the system of Crowell et al is limited by its use of analog electronics and electromechanical cams, which make the system difficult to calibrate and limit the number of control options available to the user.

Melander et al discloses a fixed quantity, variable time anti-oxidation system based on a counter which is set to a predetermined value and then counted down over time to measure oxidation of processor fluid. When the counter reaches zero, a fixed amount of anti-oxidation replenisher is added. The counter is counted up to reflect anti-oxidation replenishment provided as a result of exhaustion.

SUMMARY OF THE INVENTION

The automatic control system of the present invention is an improved fixed time, variable quantity automatic anti-oxidation replenishment control system which eliminates the accumulated overreplenishment errors which occurred in prior art fixed time, variable quantity systems. A time interval is initiated and measured by a clock means. The amount of anti-oxidation replenishment provided as a result of the exhaustion replenishment is used to provide a first replenishment signal. A stored anti-oxidation replenishment rate and the measured time are used to provide a second replenishment signal indicative of how much anti-oxidation replenishment is needed. The two signals are compared at the end of the interval. If the second signal is greater han the first signal, an amount of anti-oxidation replenshment is supplied to the developer tank as a function of the difference between the two signals. If, on the other hand, the first signal exceeds the second signal, no anti-oxidation replenishment is provided and the excess s carried over to the comparison made at the end of the ubsequent interval so that accumulated overreplenishment errors are avoided.

In one embodiment, the generation and comparison of signals in the subsequent interval is inhibited if the lifference by which the first signal exceeds the second signal is greater than the maximum anti-oxidation replenishment needed in the subsequent interval.

DETAILED DESCRIPTION OF THE PREFERRED EMBODIMENTS

Figure 1:
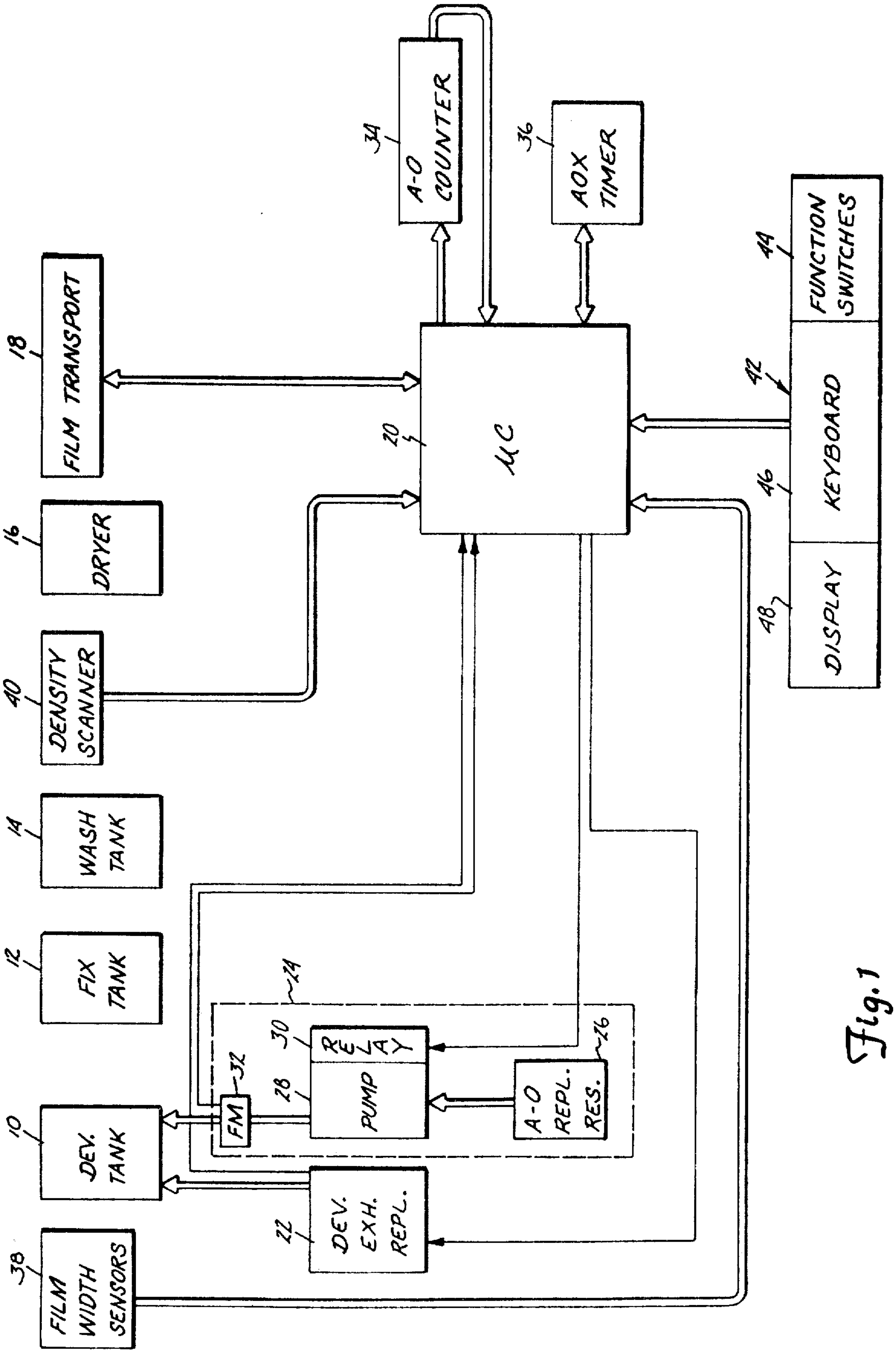
FIG. 1 is a block diagram illustrating a processor ncluding a preferred embodiment of the automatic anti-oxidation replenishment control system of the present invention.

In the system shown in FIG. 1, a photographic processor includes developer tank 10, fix tank 12, wash tank 14, and dryer 16. Film transport drive 18 transports a strip or web of photosensitive material (either film or paper) through tanks 10, 12, 14 and dryer 16. Microcomputer 20 controls operation of film transport 18 and of the automatic replenishment of fluids to tanks 10, 12 and 14.

The automatic replenishment system for preventing overreplenishment of anti-oxidation fluid includes developer replenisher 22 and anti-oxidation replenisher 24 for providing exhaustion and anti-oxidation replenishment, respectively, to developer tank 10. Microcomputer 20 controls operation of developer replenisher 22 and receives a feedback signal indicating operation of developer replenisher 22. Although in a typical processor fix and wash replenishment also are provided, these functions are not a part of the present invention, and therefore are not shown or discussed herein.

Anti-oxidation replenisher 24 includes anti-oxidation (A-O) replenisher reservoir 26, pump 28, pump relay 30, and flow meter or switch 32. Anti-oxidation replenishment is supplied from A-O replenisher reservoir 26 to developer tank 10 by pump 28 by means of relay 30, which is controlled by microcomputer 20. Flow meter or switch 32 monitors flow of A-O replenishment to developer tank 10 and provides a feedback signal to microcomputer 20.

Microcomputer 20 utilizes A-O counter 34 as a timer to control anti-oxidation replenishment. When anti-oxidation replenishment is required, microcomputer 20 loads a numerical value (AOXTIME) into A-O counter 34, which then begins counting. Microcomputer 20 energizes relay 30, which activates pump 28. When A-O counter 34 reaches a predetermined value (such as zero), it provides an interrupt signal to microcomputer 20, which deenergizes relay 30. The numerical value (AOXTIME), therefore, determines the total amount of anti-oxidation replenisher pumped into tank 10.

AOX timer 36 is a free running resettable timer which initiates and records a fixed time interval. As described later, this time interval is used by microcomputer 20 in the control of anti-oxidation replenishment.

Microcomputer 20 receives signals from film width sensors 38 and density scanner 40. Film width sensors 38 are positioned at the input throat of the processor, and provide signals indicating the width of the strip of photosensitive material as it is fed into the processor. Since microcomputer 20 also controls film transport 18, and receives feedback signals from film transport 18, the width signals from film width sensors 38 and the feedback signals from film transport 18 provide an indication of the area of photosensitive material being processed.

Density scanner 40 senses density of the processed photosensitive material. The signals from density scanner 40 provide an indication of the integrated density of the processed photosensitive material. The integrated density, together with the area of material processed, provides an indication of the amount of processor fluids used or exhausted in processing that material.

Microcomputer 20 also receives signals from control panel 42, which includes function switches 44, keyboard 46, and display 48. Function switches 44 select certain functions and operating modes of the processor. Keyboard 46 permits the operator to enter numerical information, and other control signals used by microcomputer 20 in controlling operation of the processor, including the replenishment function. Display 48 displays messages or numerical values in response to control signals from microcomputer 20.

Microcomputer 20 preferably stores set values for each of a plurality of photosensitive materials that may be processed in the processor. Each group of set values includes a pump rate for pump 28 (AOXPMPRTE), and the desired replenishment rate of anti-oxidation replenishment (AOXRT).

When operation is commenced, the operator selects (through control panel 42) one of the groups of set values which corresponds to the particular photosensitive material being processed. As the leading edge of each strip of photosensitive material is fed into the processor, film width sensors 38 sense the presence of the strip, and provide a signal indicative of the width of the strip being fed into the processor. Width sensors 38 continue to provide the signal indicative of the width of the strip until the trailing edge of the strip passes sensors 38. The length of time between the leading and trailing edges of the material passing sensors 38, and the transport speed of the material (which is controlled by microcomputer 20 through film transport 18) provide an indication of the length of the strip. The width and length information for each strip is stored until the strip has been transported through the processor and reaches density scanner 40. The area of the strip and the integrated density of the strip (which is provided by the signals from density scanner 40), provide an indication of the amount of developer which has been exhausted in processing that particular strip.

As discussed previously, the present invention relates to the type of an anti-oxidation replenishment known as "blender chemistry". Blender chemistry is based upon a "minimum daily requirement" of anti-oxidation replenishment. This minimum daily requirement is dependent upon the amount of aerial oxidation which occurs in developer tank 10, which in turn is dependent upon the open surface area of tank 10, the operating temperature of the developer solution, and a number of other factors. With blender chemistry, some anti-oxidation replenishment is provided each time that exhaustion replenishment occurs. The more exhaustion replenishment provided, the less separate anti-oxidation replenishment is required.

An anti-oxidation replenishment control system of the present invention, as shown in FIG. 1, uses pump 28 to transfer the needed amount of anti-oxidation replenisher from anti-oxidation replenisher reservoir 26 to developer tank 10. Anti-oxidation counter 34 is used to measure the amount of time that pump 28 will run, so that the correct amount is transferred to developer tank 10. When microcomputer 20 activates relay 30 to start pump 28, A-O counter 34 begins timing. When the proper amount of anti-oxidation is transmitted, pump 28 is stopped. Flow meter or switch 32 provides to microcomputer 20 a feedback signal for use in determining that replenisher has been provided to developer tank 10.

The supplying of anti-oxidation replenisher to the processor using the system of the present invention is generally as follows. AOX timer 36 initiates a fixed time interval. During this time interval, exhaustion replenishment is provided by exhaustion replenisher 22. This is done, as discussed above, as a function of the use of the developer fluid in tank 10. The use is indicated by the signals from film width sensors 38, density scanner 40, and film transport 18. Microcomputer 20 then determines and stores the accumulated amount of anti-oxidation replenishment supplied as a result of that exhaustion replenishment (AOXDEV) during the current time interval. At the end of the interval, AOX timer 36 provides a clock interrupt signal to microcomputer 20. Microcomputer 20 uses a stored anti-oxidation replenishment rate (AOXRT) and the time expired in the interval (AOXTM), as measured by AOX timer 36, to determine a second signal (AOXRT×AOXTM) which indicates the amount of anti-oxidation replenishment required in the current time interval. Microcomputer 20 then compares the first signal (AOXDEV) indicating the accumulated amount of anti-oxidation replenishment supplied in the interval as a result of the exhaustion replenishment with the second signal (AOXRT×AOXTM) indicating anti-oxidation replenishment required at the current time in the interval. If the first signal is greater than the second signal, no anti-oxidation replenishment is required and the microcomputer 20 goes on with its normal operating steps. If the second signal is greater than the first, the microcomputer 20 activates anti-oxidation replenisher 24 to provide the needed amount of anti-oxidation replenisher (AOXREPL) to developer tank 10.

The Table illustrates how microcomputer 20 determines and controls anti-oxidation replenishment in accordance with the embodiment of the present invention. AOXREPL is the needed quantity of anti-oxidation replenishment fluid.

AOXNEG keeps track of excess anti-oxidation replenishment so that the system will not be overreplenished in the subsequent time period.

Table

1. AOX timer 36 times out (e.g. 22.5 minutes)
1.a If ((AOXRATE/64)+AOXNEG) is less than zero,
  (a) update AOXNEG=(AOXRATE/64)'AOXNEG
  (b) reset AOX timer and exit
2 AOXREPL=(AOXRATE/64)−AOXDEV+AOXNEG
  (a) if AOXREPL is less than zero,
  (b) then AOXNEG=AOXREPL
  (c) reset AOXDEV
  (d) reset AOX timer and exit
  (e) else reset AOXDEV
3 reset AOXNEG to zero
4 AOXTIME=(AOXREPL/AOXPMPRTE)+AOXMINRUN
5 If AOXTIME less than 7.5 seconds then
  (a) calculate AOXMINRUN=AOXMINRUN+AOXTIME
  (b) reset AOX timer and exit
6 Output AOXTIME to A-O counter 34
7 Trigger pulse sent to counter 34 and
  (a) Replenish flag (AOX) set
8 Counter 34 begins decrementing and
  (a) Anti-ox replenishment pump 28 runs
  (b) When counter 34 times out, go to 11
9 If flow switch 32 does not activate and/or Anti-ox replenishment pump relay 30 does not energize then ERROR
10 If pump enable is turned off while counter 34 is running then
  (a) Wait 5 seconds
  (b) If change then resume 8 Else
    (1) Read value remaining in counter 34 to AOXREM
    (2) Clear counter 34
    (3) Replenish flag (AOX) reset
    (4) Reset AOX timer and exit
11 Counter 34 times out and
  (a) Interrupt request generated
12 If interrupt request not acknowledged then wait;
  Else
13 If flow switch 32 remains activated and/or pump relay 30 remains energized then ERROR;
  Else
14 Reset replenish (AOX) flag and AOX not complete flag and clear AOXMINRUN FIG. 2 contains a graphic representation of how anti-oxidation replenishment is added according to the steps shown in the Table. The horizontal axis indicates expired time. Curve 80 shows the need for anti-oxidation replenishment due to oxidation over time. Curve 80 has a constant slope. This is determined, in the process illustrated by the Table, by dividing the rate of oxidation (AOXRATE) by the number of fixed intervals in a day. Dashed curve 82 represents anti-oxidation replenishment provided as a result of exhaustion replenishment (AOXDEV). At any point along the time line, the vertical distance between the two lines represents the anti-oxidation status of the system. If the curve 82 is below curve 80, the system is underreplenished. If curve 82 is above curve 80, the system is overreplenished.

Figure 2:
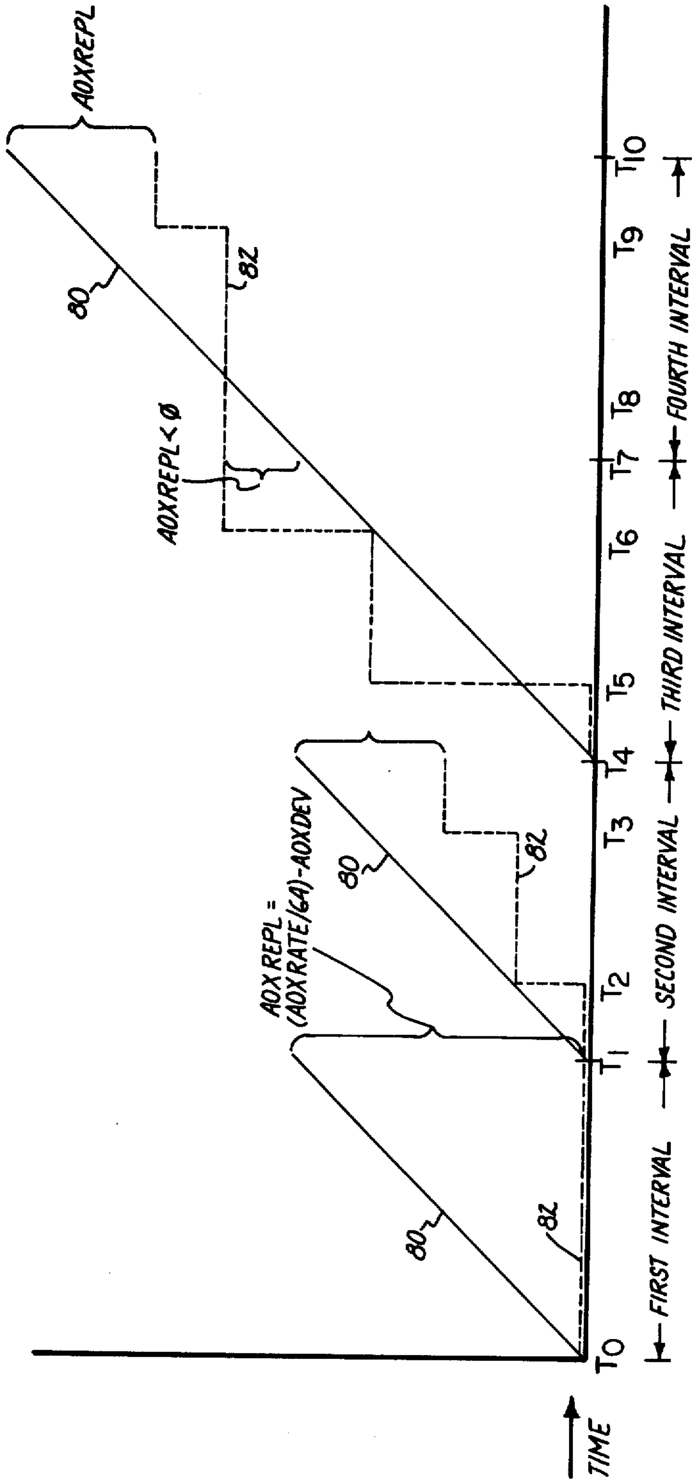
FIG. 2 is a graph illustrating the operation of the control system of the present invention.

In the example shown in FIG. 2, a first fixed time interval is initialized at time $T_0$. The fixed time intervals end at times $T_1$, $T_4$, $T_7$, and $T_{10}$. During the first time interval from $T_0$ to $T_1$, no exhaustion replenishment occurs. The need for anti-oxidation replenishment increases at a steady rate throughout the period. At time $T_1$, the need for anti-oxidation replenishment represented by curve 80 is compared with the AOXDEV, represented by curve 82. Brace 100 represents this value. The amount of needed anti-oxidation replenishment (AOXREPL) is then added at time $T_1$.

During the second time interval from time $T_1$ to time $T_4$, exhaustion replenishment occurs at times $T_2$ and $T_3$. Therefore, at the end of the second interval at time $T_4$, the difference between the two curves is much smaller than at the end of the first interval. The needed amount of anti-oxidation replenishment (AOXREPL) that is added at time $T_4$ is correspondingly smaller.

A third interval extends from time $T_4$ to time $T_7$. During this interval, exhaustion replenishment occurs at times $T_5$ and $T_6$. At time $T_5$, the exhaustion replenishment curve 82 intersects the curve 80 and extends above it. For the period from time $T_5$ to time $T_6$, the system is slightly overreplenished as to anti-oxidation. At time $T_6$, the curves intersect. When exhaustion replenishment occurs at time $T_6$, the system is again overreplenished. When the interval ends at time $T_7$, the system is still overreplenished. Therefore, no anti-oxidation replenishment is provided and the parameters are not reinitialized. Computation continues through the next period, which extends from $T_7$ to $T_{10}$. At time $T_8$, the curves again intersect and the system is slightly underreplenished when exhaustion replenishment occurs again at time $T_9$. At time $T_{10}$ at the end of the fourth interval, the system is underreplenished. At this point, anti-oxidation replenishment (AOXREPL) occurs. The parameters are reinitialized and the intervals start anew.

A variable quantity system is best used in a system where precision in replenishment is required. A variable quantity system provides exact measurement. A control system constructed according to the present invention eliminates the problem of accumulated anti-oxidation overreplenishment errors to which the prior systems were subject. By considering in a subsequent interval the excess anti-oxidation replenishment provided by exhaustion replenishment in a previous interval, the accumulated overreplenishment errors are prevented.

Although the present invention has been described with reference to preferred embodiments, workers skilled in the art will recognize that changes may be made in form and detail without departing from the spirit and scope of the invention.

What is claimed is:

1. A method of providing replenishment to processor fluid in a processor photosensitive material, the method comprising:

(a) commencing a predetermined time interval;

(b) providing exhaustion replenishment during the time interval as a function of the use of processor fluid;

(c) providing a first replenishment signal indicative of (1) an accumulated amount of anti-oxidation replenishment supplied as a result of the exhaustion replenishment during the time interval and (2) an amount of excess anti-oxidation replenishment carried over from a preceding interval, if any;

(d) providing a second replenishment signal indicative of an amount of anti-oxidation replenishment required during the time interval as a function of a stored anti-oxidation replenishment rate;

(e) comparing the first and second replenishment signals at the end of the time interval;

(f) if the second replenishment signal is greater than the first replenishment signal, providing anti-oxidation replenishment in an amount which is a function of a difference between the first replenishment signal and the second replenishment signal;

(g) if the first replenishment signal is greater than the second replenishment signal, providing no anti-oxidation replenishment and determining the amount of excess anti-oxidation replenishment to be carried over to a subsequent interval based upon an amount by which the first replenishment signal exceeds the second replenishment signal;

(h) commencing a subsequent time interval in which steps (b)–(h) are repeated.

2. The method of claim 1, further comprising the step of inhibiting the comparing of the first and second replenishment signals and the providing of anti-oxidation replenishment in the subsequent interval, if the amount of excess anti-oxidation replenishment exceeds a maximum anti-oxidation replenishment amount required in the subsequent interval.

3. A control system for controlling anti-oxidation replenisher means to provide anti-oxidation replenishment to a processor of photosensitive material, the control system comprising:

means for measuring a predetermined time interval and providing a clock signal at the end of the time interval;

means for storing an exhaustion replenishment rate;

means for storing an anti-oxidation replenishment rate;

means for providing a signal indicative of use of processor fluid;

means for providing exhaustion replenishment during the time interval as a function of the signal indicative of use of processor fluid and the exhaustion replenishment rate;

means for providing a first replenishment signal indicative of (1) an accumulated amount of anti-oxidation replenishment provided by exhaustion replenishment during the time interval and (2) an amount of excess anti-oxidation replenishment amount carried over from a preceding interval;

means for providing a second replenishment signal indicative of the anti-oxidation replenishment needed as a function of the stored anti-oxidation replenishment rate and expired time since the last anti-oxidation replenishment;

means responsive to the clock signal for comparing the first replenishment signal with the second replenishment signal at the end of the time interval;

means for causing the anti-oxidation replenisher means to provide an amount of anti-oxidation replenishment which is a function of the amount by which the second replenishment signal exceeds the first replenishment signal, if the second replenishment signal is greater than the first replenishment signal; and means for determining the excess anti-oxidation replenishment amount to be carried out to a subsequent interval as a function of an amount by which the first signal is greater than the second signal.

4. The apparatus of claim 3 further comprising:

means for inhibiting the comparing of the first and second replenishment signals and the providing of anti-oxidation replenishment in the subsequent interval if the amount of excess anti-oxidation replenishment exceeds a maximum anti-oxidation replenishment amount required in the subsequent interval.

5. The apparatus of claim 3 wherein:

the first and second replenishment signals are digital signals;

the anti-oxidation replenishment rate and exhaustion replenishment rate are stored as digital data; and the means for comparing the first and second replenishment signals is a programmed digital computer.

6. A computer-based control system for controlling anti-oxidation replenisher means for providing anti-oxidation replenisher to a processor of photosensitive material, the control system comprising:

clock means for measuring a predetermined time interval and providing a clock signal at the end of the time interval;

exhaustion replenishment means responsive to a first replenishment signal for providing exhaustion replenishment;

means for providing a signal indicative of use of processor fluid;

anti-oxidation replenishment means responsive to a second replenishment signal for providing anti-oxidation replenishment; and programmed digital computer means for:

storing a digital value representing an exhaustion replenishment rate;

receiving the signal indicative of use of processor fluid;

receiving the clock signal from the clock means;

storing a digital value representing an anti-oxidation replenishment rate;

providing the first replenishment signal to the exhaustion replenishment means as a function of the signal indicative of use of processor fluid and the value representing the exhaustion replenishment rate;

providing a first digital replenishment value indicative of (1) an accumulated amount of anti-oxidation replenishment provided by exhaustion replenishment during the time interval and (2) an excess anti-oxidation replenishment amount carried over from a preceding interval;

providing a second digital replenishment value indicative of the anti-oxidation replenishment needed as a function of the stored value representing anti-oxidation replenishment rate and expired time since a last previous anti-oxidation replenishment by the anti-oxidation replenishment means;

comparing the first replenishment value with the second replenishment value at the end of the time interval in response to the clock signal;

providing the second replenishment signal to the anti-oxidation replenishment means indicative of an amount of anti-oxidation replenishment which is a function of the amount by which the second replenishment value exceeds the first replenishment value, if the second replenishment value is greater than the first replenishment value; and determining the excess anti-oxidation replenishment amount to be carried out over to a subsequent interval as a function of an amount by which the first value is greater than the second value.

7. The control system of claim 6 wherein the digital computer means inhibits the comparing of the first and second replenishment values and the providing of the second replenishment signal in the subsequent interval if the excess anti-oxidation replenishment amount exceeds a maximum anti-oxidation replenishment amount required in the subsequent interval.

* * * * *